Aug. 15, 1950

R. H. GODDARD 2,518,882

COMBINED IGNITING AND FUEL FEED CONTROL
MECHANISM FOR A THRUST UNIT
Filed Dec. 4, 1948

INVENTOR.
ROBERT H. GODDARD, D'C'D.
ESTHER C. GODDARD, EXECUTRIX.
BY Chas. T. Hawley
ATTORNEY.

Patented Aug. 15, 1950

2,518,882

UNITED STATES PATENT OFFICE 2,518,882

COMBINED IGNITING AND FUEL FEED CONTROL MECHANISM FOR A THRUST UNIT

Robert H. Goddard, deceased, late of Annapolis, Md., by Esther C. Goddard, executrix, Worcester, Mass., assignor of one-half to The Daniel and Florence Guggenheim Foundation, New York, N. Y., a corporation of New York Application December 4, 1948, Serial No. 63,603

6 Claims. (Cl. 60—44)

This invention relates to thrust units, such as rockets or other jet propulsion devices, which have a combustion chamber in which mixed combustion liquids are ignited and consumed.

It is the general object of the present invention to provide a simple mechanism by which an igniting flame is produced in said chamber and by which the feed of combustion liquids to said chamber is initiated immediately thereafter.

In the preferred form, the liquid fuel is admitted slightly prior to the liquid oxidizer, and both the ignition and the fuel feed are electrically controlled.

The invention further relates to arrangements and combinations of parts which will be hereinafter described and more particularly pointed out in the appended claims.

A preferred form of the invention is shown in the drawing, in which

Figure 1:
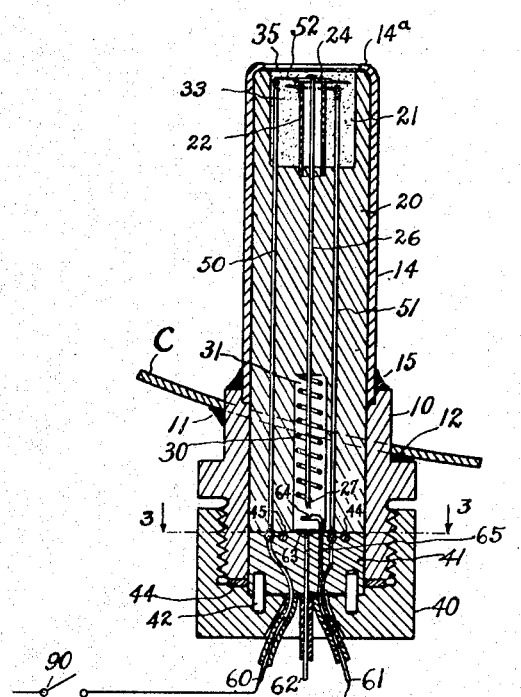
Fig. 1 is a sectional side elevation of the improved igniting and feed control mechanism.

Referring to the drawing, the igniting and feed control mechanism comprises a metal head 10 which is inserted in the rear wall of a combustion chamber C and which may be welded or brazed to the chamber wall, as indicated at 11 and 12.

A steel tube 14 is seated in the inner end of the head 10 and is welded or brazed in position, as indicated at 15. The inner end 14a of the tube 14 is inwardly crimped or contracted to provide a flange or ledge which positions the inner end of a porcelain bushing 20.

The bushing 20 has a substantial recess 21 in its inner end and also has a small tube 22 axially positioned in said recess and secured in said bushing. This small tube is to be made of some firm but combustible material.

A thin disc 24 of Celluloid or other quickly inflammable material covers the open end of the tube 22 and is held in position by a small rod or wire 26 which extends freely through an axial opening in the bushing 20 and which is connected at 27 to the free end of a coil spring 30, which spring is mounted in an axial recess 31 in the outer end of the bushing 20.

The recess 21 is to be filled with a charge 33 of gun powder or other similar material which will continue burning one or two seconds. The open end of the recess 21 is closed by a disc or cover 35 of thin water-proof material which is axially spaced from the disc 24 and which may be readily displaced by gas pressure in said recess.

The outer end of the head 10 is threaded to receive a cap 40 having a porcelain plug 41 which is seated therein and which is held from relative rotation by pins 42. The plug 41 is slidable and rotatable in the lower end of the head 10, and is firmly seated against a copper gasket 44 which provides a gas-proof joint between the head 10 and the cap 40.

Contact rings 44 and 45 are mounted in grooves in the inner face of the plug 41 and are engaged by the enlarged outer ends of wires 50 and 51 which extend upward through the bushing 20 into the recess 21 and which have their upper ends mechanically connected by a coil 52 of a very fine resistance wire.

A line wire 60 is connected through the cap 40 and plug 41 to the contact ring 44, and a similar wire 61 is connected to the ring 45, both of these wires being insulated from the cap 40. A third wire 62 is brought in through the cap 40 and plug 41 and terminates in a contact disc 63.

A flexible contact member 64 is mounted above the disc 63 and is connected by a wire 65 to the wire 61 previously described.

Figure 4:
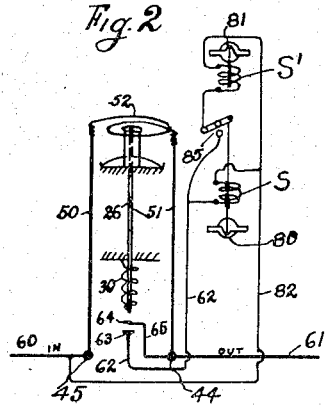
Fig. 4 is an illustrative wiring diagram.

In Fig. 4 there is shown a valve 80 to control the feed of gasoline or other liquid fuel to the combustion chamber, and a valve 81 to control the feed of liquid oxygen or other liquid oxidizer. The valve 80 is controlled by a solenoid S, and the valve 81 by a second solenoid S'.

The solenoid S is connected between the wire 62 previously described and a branch wire 82 which connects with the line wire 60. The solenoid S is operative to open the valve 80 and to simultaneously close a switch 85.

When this switch is closed, a parallel branch circuit is closed through the second solenoid S', thereby opening the oxidizer valve 81.

The operation of the improved igniting and control mechanism is as follows: When the main switch 90 in the line wires 60 and 61 is closed, current passes through the rings 44 and 45 to the wires 50 and 51, which in turn are connected by the fine resistance wire 52. This wire is immediately overheated and burned out and at the same time ignites the powder charge in the recess 21. The combustion gases blow off the cover 35 and the powder flame enters the combustion chamber C.

The burning powder also ignites the quickly inflammable disc 24, and the burning of the disc 24 immediately releases the axial wire or rod 26 which has previously held the spring 30 under compression.

As soon as the wire 26 is released, the spring 30 expands, forcing the contact 64 against the disc 63 and thus completing a circuit through the solenoid S which then opens the fuel valve 80.

As the valve 80 is opened, the switch 85 is closed, thereby causing the solenoid S' to open the oxidizer valve 81. The two combustion liquids then enter the combustion chamber in predetermined but quick succession and very promptly after the production of the igniter flame.

The powder charge continues to burn for one or two seconds, so that the flame lasts long enough to effectively start combustion of the mixture of gasoline and liquid oxygen in the combustion chamber.

Figure 2:
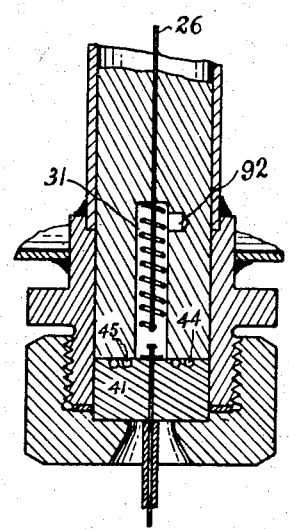
Fig. 2 is an enlarged sectional elevation of certain parts shown in Fig. 1.
Figure 3:
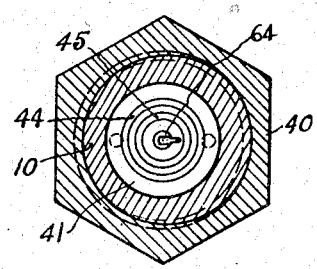
Fig. 3 is a transverse sectional plan view, taken along the line 3—3 in Fig. 1.

After the operation of the combustion chamber has been completed, the cap 40 and plug 41 may be removed and the bushing 20 may then be pulled out by inserting a hook through the recess 31 and into a notch or slot 92 (Fig. 2) at the inner end of the recess 31.

A new tube 22 may then be placed in the recess 21 and a new disc 24 may be secured in position. The recess 21 is again filled with powder, the wires 50 and 51 are replaced if necessary, and these wires are again connected by a fine resistance wire 52. The bushing 20 is then replaced in the tube 14 and a new waterproof cover 35 is placed in position. The igniter is then ready for another combustion operation.

It will be understood that the valve mechanism shown in Fig. 4 is illustrative only and that any other suitable valve mechanism may be substituted, provided only that the valves are opened successively and promptly after the engagement of the contact 64 with the disc 63.

Having thus described the invention and the advantages thereof, it will be understood that the invention is not to be limited to the details herein disclosed, otherwise than as set forth in the claims, but what is claimed is:

1. In an igniting and feed controlling mechanism having a powder charge and having feed valves for liquid fuel and a liquid oxidizer, in combination, means to ignite the powder charge, a normally-open electric circuit, a device effective to open said feed valves and rendered operative by the closing of said electric circuit, and means released to close said circuit by ignition of said powder charge.

2. In an igniting and feed controlling mechanism having a powder charge and having feed valves for liquid fuel and a liquid oxidizer, in combination, means to ignite the powder charge, a normally-open electric circuit, two separate valve-opening means rendered operative in predetermined order and in quick succession by the closing of said electric circuit, and means released to close said circuit by ignition of said powder charge.

3. In an igniting and feed controlling mechanism having a powder charge and having feed valves for liquid fuel and a liquid oxidizer, in combination, a normally-open electric circuit, a solenoid in said circuit operative to open the fuel valve when said solenoid is activated, a device to close said circuit which includes an inflammable release member, means to ignite the powder charge and to thereby ignite and consume said release member and to thereby render said solenoid operative, and valve-opening means controlled by activation of said solenoid and rendered effective thereby to promptly open the oxidizer valve.

4. In an igniting and feed controlling mechanism having a powder charge and having feed valves for liquid fuel and a liquid oxidizer, in combination, means to ignite the powder charge, means released by such ignition and effective to open the fuel feed valve, and a device rendered operative by said valve-opening means to effect opening of the oxidizer valve immediately after said fuel feed valve opens.

5. In an igniting and feed controlling mechanism having a powder charge and having feed valves for liquid fuel and a liquid oxidizer, in combination, means to ignite the powder charge, a fine resistance wire in said powder charge, means to overheat and consume said wire and to thereby ignite said powder charge, means to open said feed valves, an inflammable release member exposed to said powder charge and which normally holds said valve-opening means inoperative, and said valve-opening means being released for operation by combustion of said release member on ignition of said powder charge.

6. In an igniting and feed controlling mechanism having a powder charge and having feed valves for liquid fuel and a liquid oxidizer, in combination, means to ignite the powder charge, a fine resistance wire in said powder charge, means to overheat and consume said wire and to thereby ignite said powder charge, means to open said fuel and oxidizer valves successively, an inflammable release member exposed to said powder charge and which normally holds said valve-opening means inoperative, and said valve-opening means being rendered operative by combustion of said release member on ignition of said powder charge.

ESTHER C. GODDARD,
*Executrix of the Last Will and Testament of Robert H. Goddard, Deceased.*

REFERENCES CITED

The following references are of record in the file of this patent:

UNITED STATES PATENTS

| Number | Name | Date |
|---|---|---|
| 2,300,968 | Reichhelm | Nov. 3, 1942 |
| 2,335,471 | Ashcraft | Nov. 30, 1943 |